(12) United States Patent
Ehrenleitner

(10) Patent No.: US 7,644,679 B2
(45) Date of Patent: Jan. 12, 2010

(54) PLANT FOR THE TREATMENT, IN PARTICULAR THE CATAPHORETIC DIP COATING OF OBJECTS, IN PARTICULAR OF VEHICLE CHASSIS

(75) Inventor: Franz Ehrenleitner, Altensteig-Walddorf (DE)

(73) Assignee: Eisenmann Anlagenbau GmbH & Co. KG, Boeblingen (DE)

( * ) Notice: Subject to any disclaimer, the term of this patent is extended or adjusted under 35 U.S.C. 154(b) by 918 days.

(21) Appl. No.: 10/507,091

(22) PCT Filed: Feb. 1, 2003

(86) PCT No.: PCT/EP03/01009

§ 371 (c)(1),
(2), (4) Date: Jun. 13, 2005

(87) PCT Pub. No.: WO03/076080

PCT Pub. Date: Sep. 18, 2003

(65) Prior Publication Data

US 2005/0269205 A1    Dec. 8, 2005

(30) Foreign Application Priority Data

Mar. 13, 2002 (DE) .............................. 102 10 941

(51) Int. Cl.
*B05C 3/00* (2006.01)
(52) U.S. Cl. ...................................... 118/423; 118/500
(58) Field of Classification Search .................. 118/423, 118/500, 501; 248/123.11, 123.2, 162.1, 248/182.1
See application file for complete search history.

(56) References Cited

U.S. PATENT DOCUMENTS

| 5,098,049 A | * | 3/1992 | van Vlaardingen | ..... 248/123.11 |
| 7,393,444 B2 | * | 7/2008 | Ehrenleitner | ................ 204/623 |

FOREIGN PATENT DOCUMENTS

DE    201 05 676 U1    8/2001

* cited by examiner

*Primary Examiner*—Brenda A Lamb
(74) *Attorney, Agent, or Firm*—Factor & Lake, Ltd.

(57) ABSTRACT

The invention relates to a plant for the treatment, in particular the cataphoretic dip coating of objects, in particular of vehicle chassis, comprising at least one transport car (5) which runs the objects (4) through the plant and introduces and retrieves the above to and from several treatment containers. The transport car (5) comprises a chassis (7, 8, 9 to 12), which travels along the trajectory of the objects (4), at least one pivot arm (50, 51), connected to the chassis (7, 8, 9 to 12), a mounting (61) joined to the pivot arm (50, 51), for at least one object. The translational displacement and the pivoting displacement of the at least one pivot arm (50, 51) and the mounting (61) are effected by independent drive devices. In order to reduce the energy required for the pivoting of the pivot arms (50, 51), at least one energy store (42) is provided, which buffers the energy released on dropping the object as elastic energy and from which the buffered energy can be recovered to support the upwards motion of the object.

6 Claims, 7 Drawing Sheets

Figure 1:
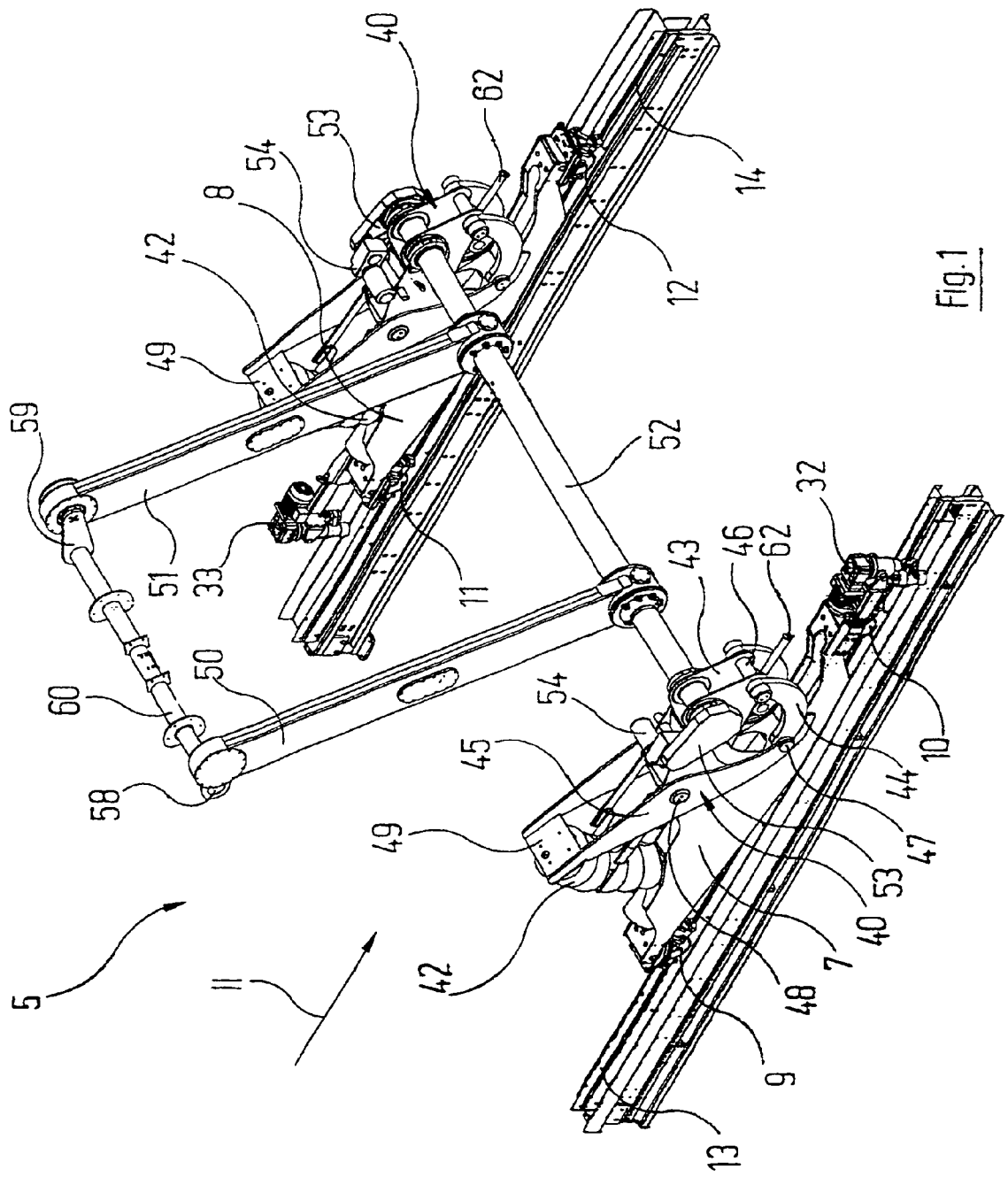

PLANT FOR THE TREATMENT, IN PARTICULAR THE CATAPHORETIC DIP COATING OF OBJECTS, IN PARTICULAR OF VEHICLE CHASSIS

The invention relates to a system for treating, in particular cataphoretically dip-coating, articles, in particular vehicle bodies, comprising
a) at least one treatment container, in which the articles may be acted upon in each case by a treatment liquid;
b) at least one feed carriage, by means of which the articles are conveyed through the system and in the process introduced into and removed from the treatment container and which in turn comprises:
  ba) running gear movable along the path of motion of the articles;
  bb) at least one swivel arm coupled to the running gear;
  bc) a holding device coupled to the swivel arm for at least one article;
  bd) mutually independently actuable drives for the translational movement, the swivelling of the at least one swivel arm and of the holding device;
  be) a counterbalancing device, by means of which the force needed to swivel the at least one swivel arm may be reduced.

In enamelling lines for vehicle bodies, but also for other articles, there are a number of treatment containers, in which the articles are acted upon by a treatment liquid. Here, by "acted upon" is meant both wave-flow treatment and spraying as well as immersion of the articles with and/or into the treatment liquid. "Wave-flow treatment" is an operation, in which relatively large quantities of treatment liquid are applied onto the articles per unit of time. Such wave-flow treatment is used, for example, for the primary cleaning of vehicle bodies in the so-called pre-treatment zone. By spraying is meant the generation of a very fine spray mist that penetrates into every nook and cranny and otherwise inaccessible point of the articles being treated. Such spraying operations are used, for example, both to clean and phosphatize, passivate or activate surfaces as well as to rinse off a treatment liquid. In the case of immersion, the articles are, as the name suggests, submerged in a bath of the treatment liquid. Immersion operations are used, for example, likewise for cleaning and for the other processes occurring in the pre-treatment zone, but also for the enamelling operation itself.

What is particularly important in such systems is the manner in which the articles are conveyed through the system and introduced into and removed from the individual treatment containers. The kinematics of the articles used in said case should, firstly, ensure that the treatment liquid has optimum access to the articles but may also be removed completely from the articles. Secondly, the kinematics of the articles should be such that the length of the treatment containers and hence also the length of the entire system remains as short as possible.

In this connection, a system of the initially described type, such as is described in DE-U-201 05 676, has proved particularly successful. The degrees of freedom of motion provided by the feed carriage used for the articles in the known system optimally meets the previously described requirements. In order to keep the energy needed to swivel the swivel arms as low as possible, the known system uses counterweights. Such counterweights are however unable to prevent the energy that is released during lowering of the articles from being lost and having to be summoned up afresh for lifting the articles. When different articles of differing weight are to be treated in the system, an optimum adaptation of the counterweight is in any case difficult or even impossible.

The object of the present invention is to develop a system of the initially described type in such a way that the energy demand for swivelling the at least one swivel arm is minimized.

This object is achieved according to the invention in that
c) the counterbalancing device comprises at least one energy storage mechanism, in which the energy released during lowering of the article is temporarily storable by virtue of elastic deformation of a medium and from which the temporarily stored energy is retrievable in order to assist the upward movement of the article.

The energy storage mechanism according to the invention therefore does not just provide a counterforce, which at least partially counterbalances the weight of the article acting upon the swivel arm, but reduces the energy consumption in that it utilizes the energy, which is released during lowering of the article owing to non-counterbalanced weights, for the lifting operation of the article.

It is particularly preferred that the energy storage mechanism comprises at least one gas-filled, in particular air-filled bellows device. Such bellows are very much more suitable than springs for taking up heavy weights, such as arise in particular during the treatment of vehicle bodies, and nevertheless following large angular movements of the swivel arms.

When the internal pressure of the bellows device is adjustable, the spring characteristic of the bellows device may be individually adapted to the weight of the respective article being carried by the feed carriage.

Naturally, in cases where the articles to be treated are not overly heavy and the angles to be travelled by the swivel arm are not overly large, a spring, e.g. a pneumatic spring, may alternatively be used as an energy storage mechanism.

In said case, to avoid vibrations it is recommended that a suitable damping apparatus be associated with the spring.

In a particularly preferred embodiment of the invention, a linkage comprising a plurality of hinge-connected elements lies in the energy flow between the at least one swivel arm and the energy storage mechanism. This linkage may by virtue of the geometry and number of the individual elements be designed in such a way that the generally existing dependence of the spring energy of the energy storage mechanism upon the spring excursion thereof is substantially eliminated, thereby making it possible for the swivelling of the at least one swivel arm to be effected along the entire path of motion thereof with substantially equal force. Such a linkage may also substantially compensate the fact that the torque exerted by the weight of the article on the swivel arm is a function of the swivelling angle, in particular a sine function.

For this purpose, a refinement of the invention is particularly suitable, in which the linkage comprises three elements, of which the element that acts upon the energy storage mechanism is designed as a rocker-like, two-armed lever.

When the elements of the linkage comprise in each case two links, which are connected to one another by the joint pins, about which the elements are pivotable, the weight of the linkage is comparatively low without this leading to a loss of mechanical stability.

In a preferred embodiment, the linkage is also utilized to introduce the energy needed for the swivelling motion of the swivel arm. It is notable for the fact that the drive for the at least one swivel arm comprises at least one motor, which drives a threaded spindle, which in turn interacts with a threaded coupling fastened pivotably to an element of the linkage.

Figure 2:
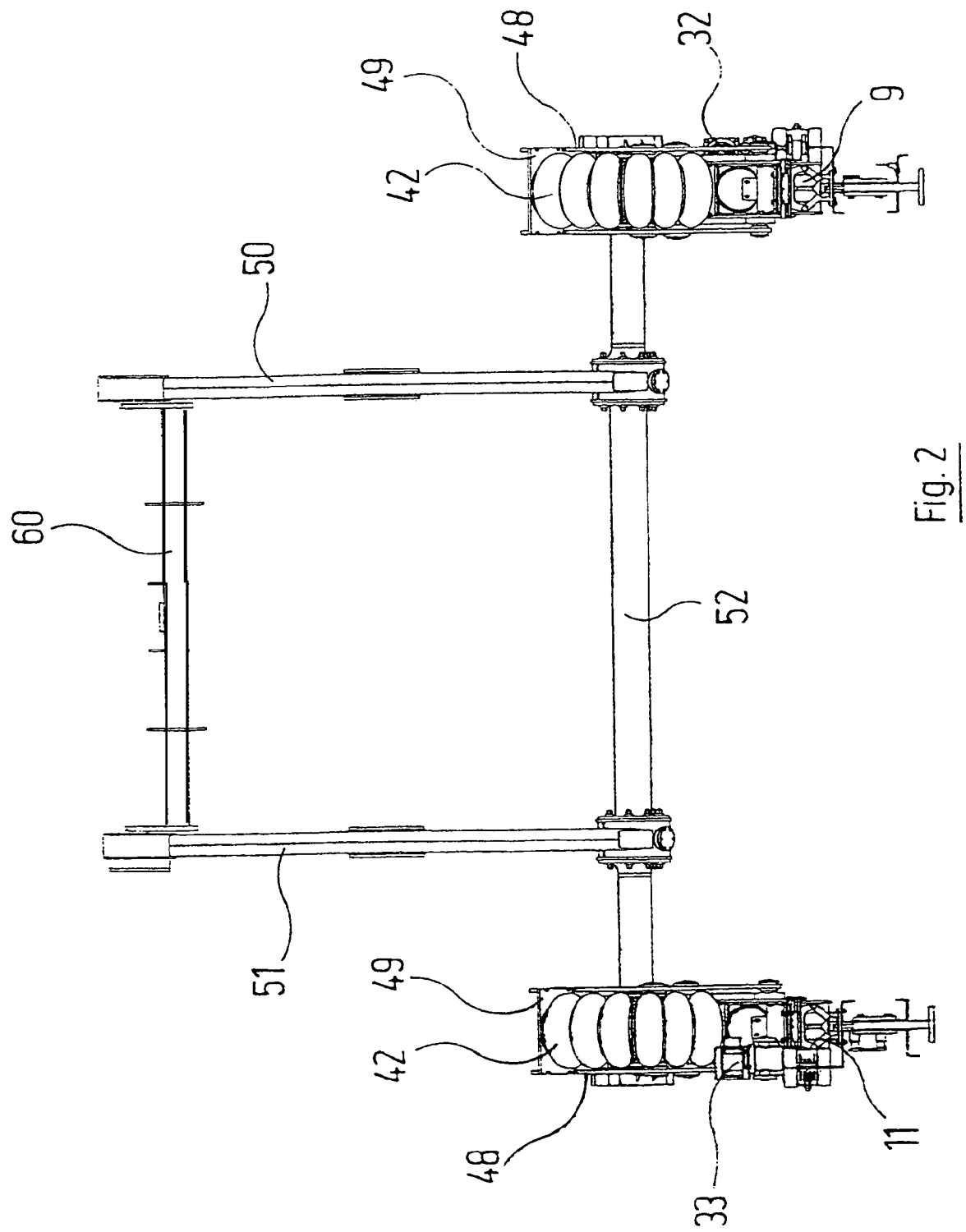
Figure 3:
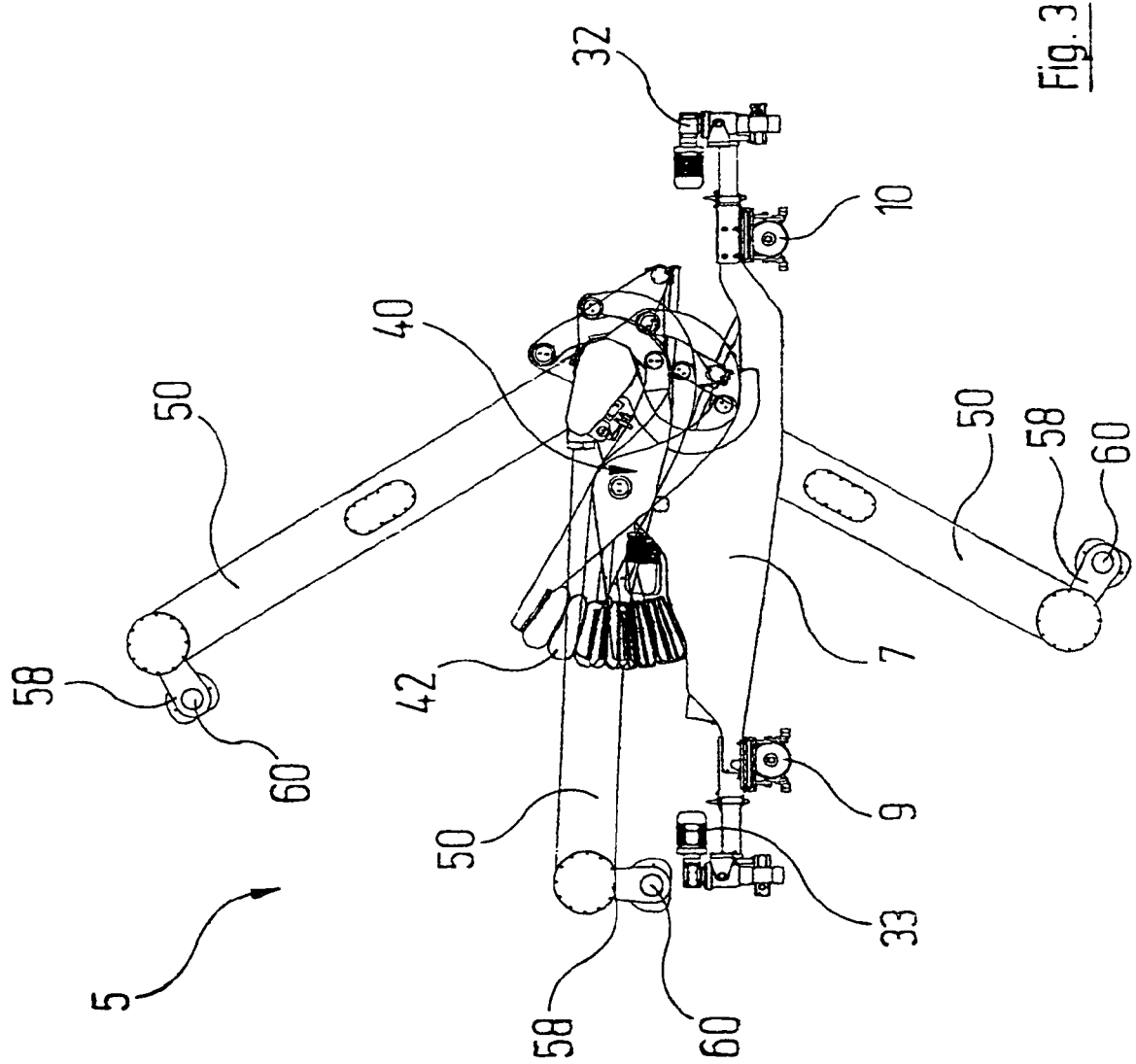
Figure 4:
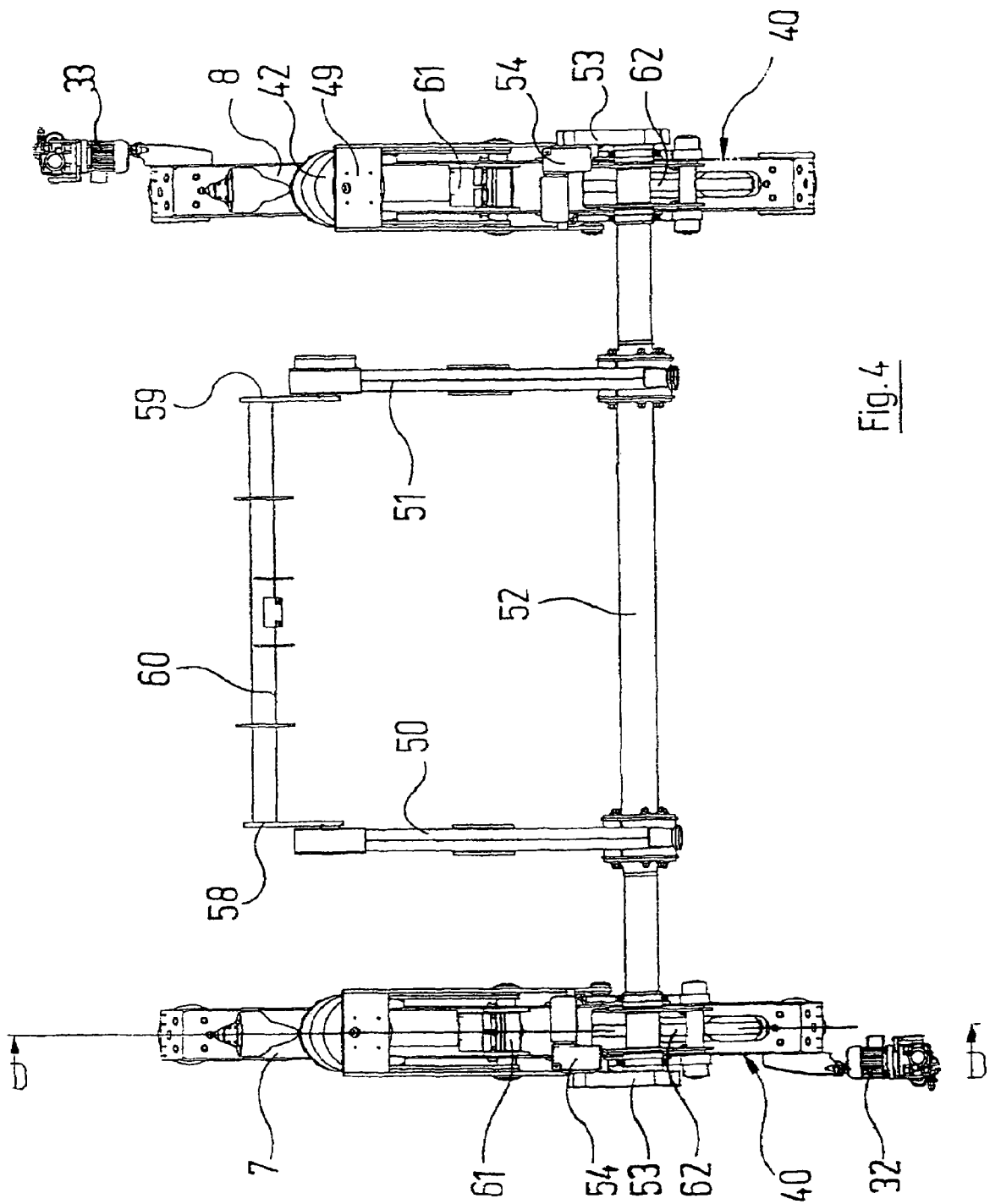
Figure 5:
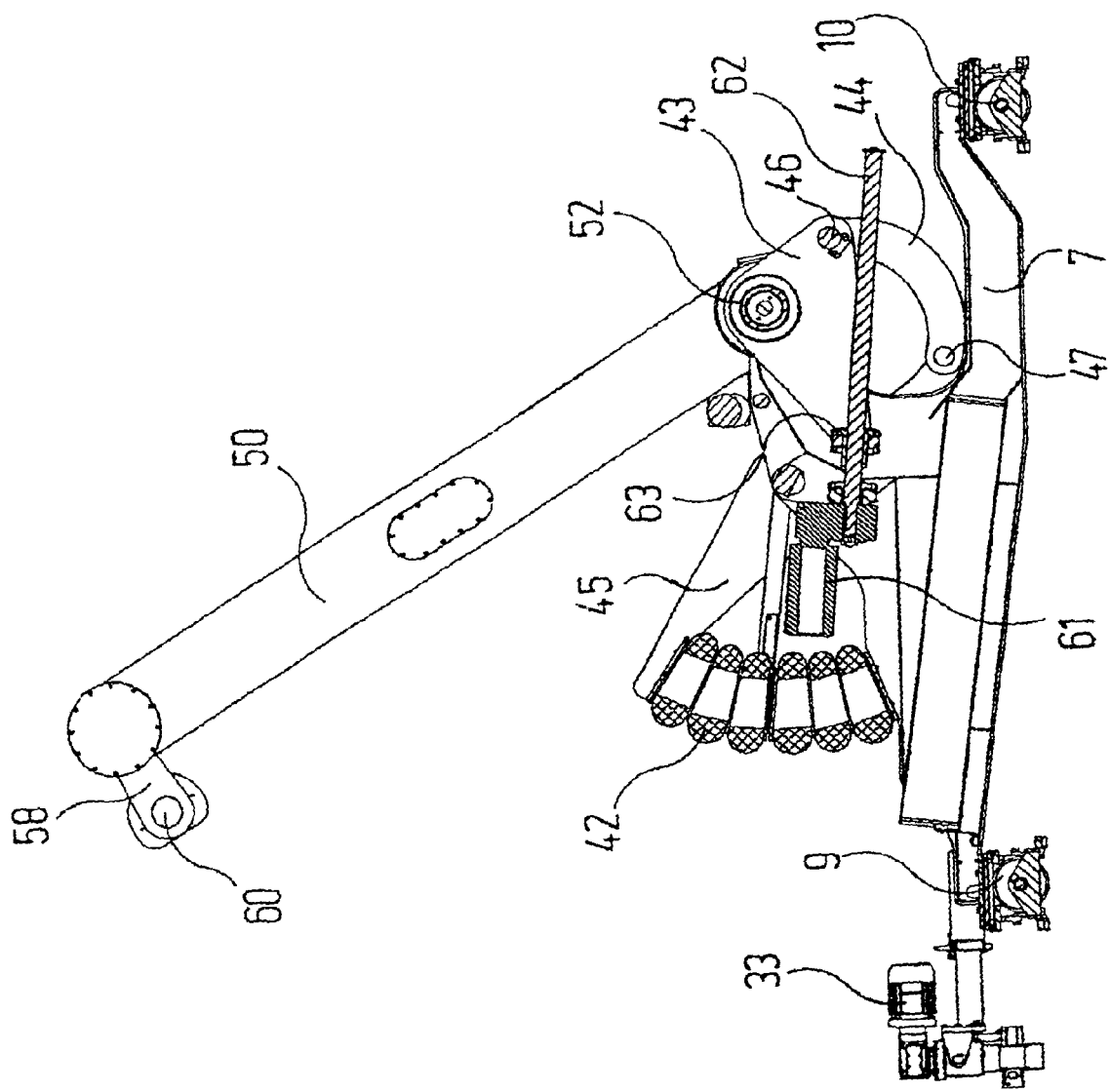
Figure 6:
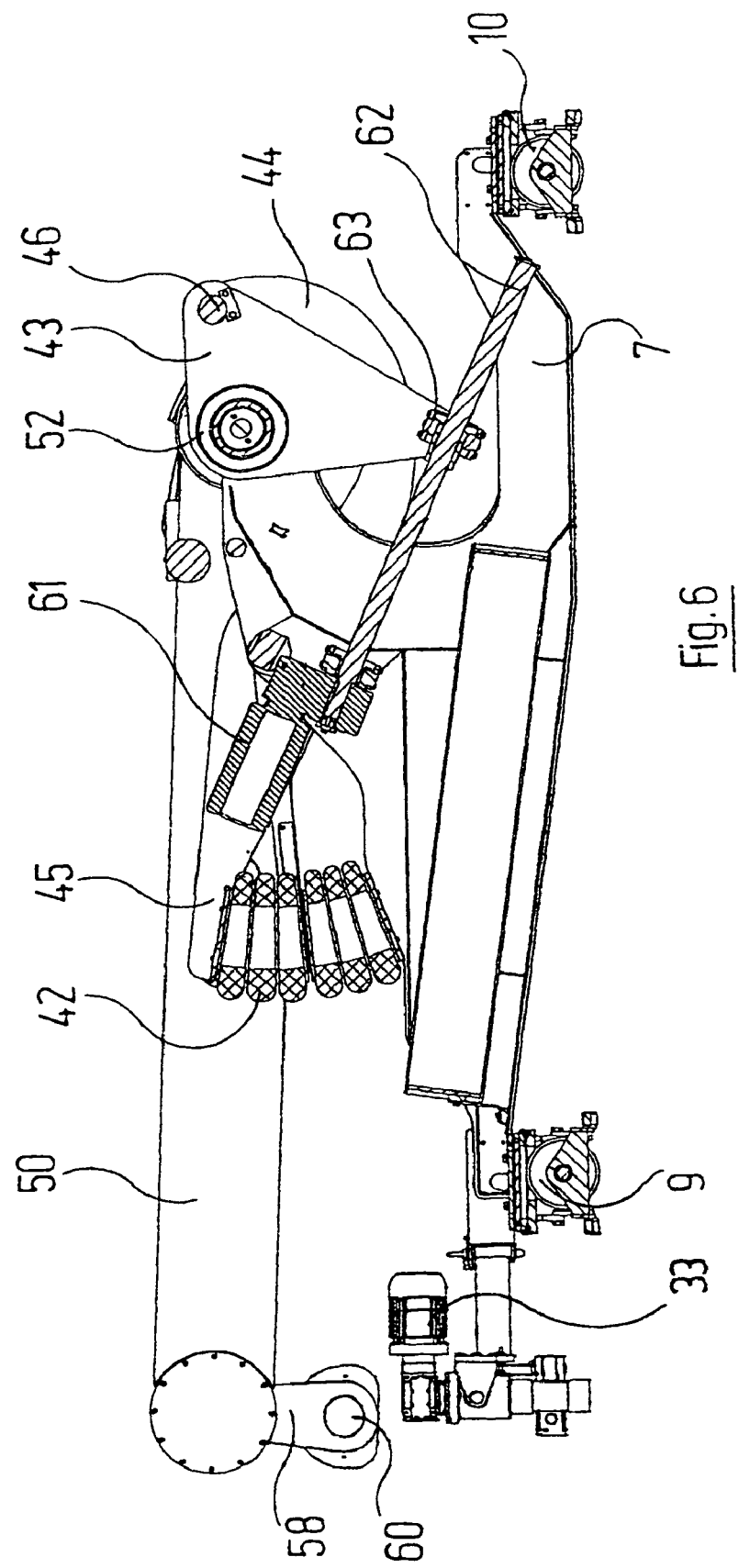
Figure 7:
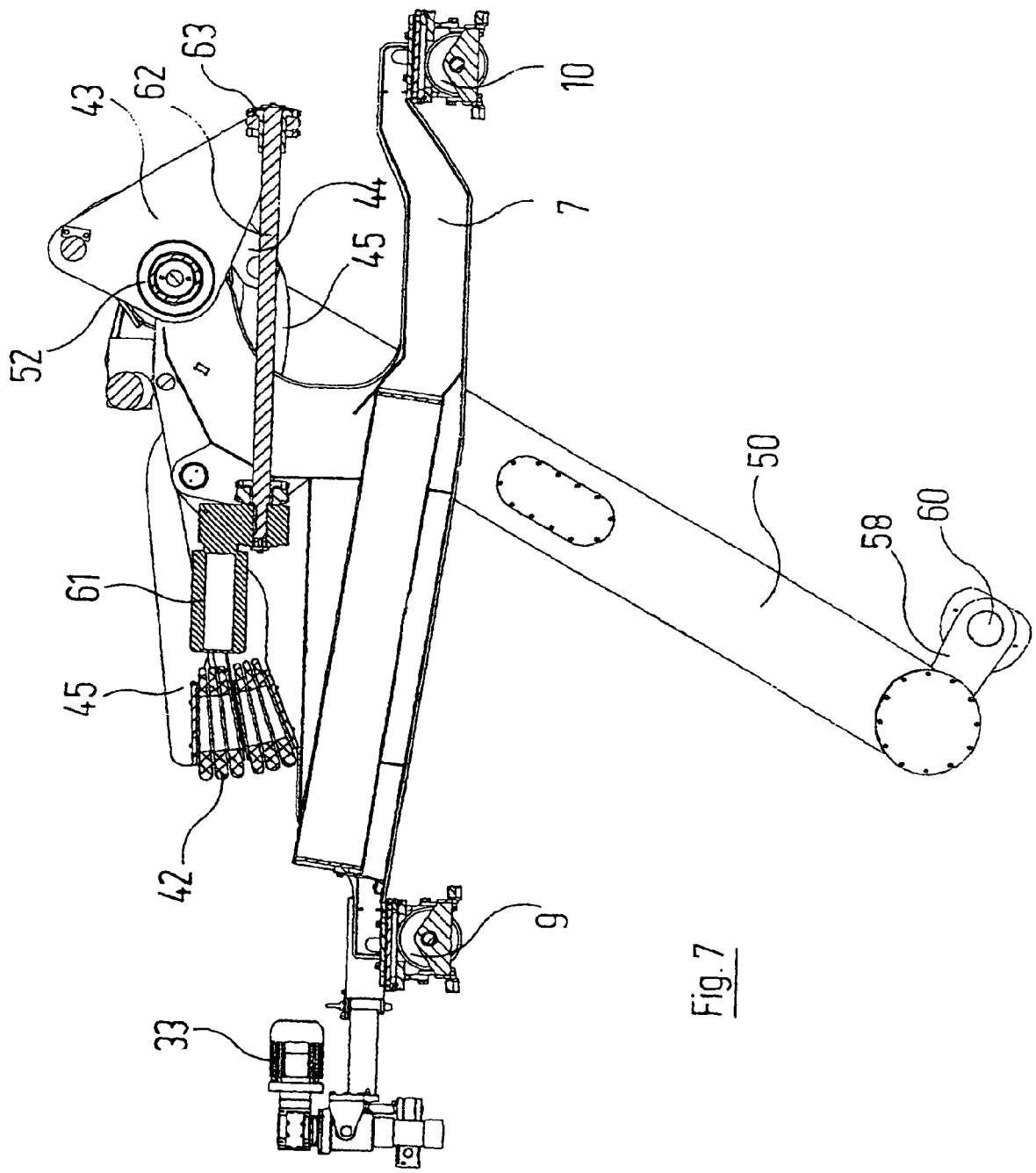

There now follows a detailed description of an embodiment of the invention with reference to the drawings; the drawings show:

FIG. 1 a perspective view of the components of a feed carriage that are necessary for an understanding of the present invention;

FIG. 2: the feed carriage of FIG. 1, viewed in the direction of the arrow II of FIG. 1;

FIG. 3: the feed carriage of FIGS. 1 and 2, viewed from the side in different positions of the swivel arm forming part of the feed carriage;

FIG. 4: the plan view of the feed carriage of FIGS. 1 and 2;

FIGS. 5 to 7: sections according to line D-D of FIG. 4 in different positions of the swivel arm.

The feed carriage denoted as a whole by the reference character 5 in the drawings is, in terms of its basic functions and in terms of its basic construction, known from DE-U-201 05 676. So as not to overcomplicate the drawings and the description pertaining thereto, various components of the feed carriage 5 have been left out of the drawings. With regard to these components, additional reference is made to DE-U-201 05 676.

As may be gathered in particular from FIGS. 1 and 2, each feed carriage 5 has two longitudinal tie-bars 7, 8, at the underside of each of which two twin wheels 9, 10 and 11, 12 are mounted rotatably about a horizontal axis. The wheels 9 to 12 are additionally rotatable in each case with the aid of an individually non-illustrated swivelling bolster about a vertical axis, so that the alignment of the twin wheels 9 to 12 relative to the respective longitudinal tie-bars 7, 8 may be varied.

The twin wheels 9, 10 roll along a first running surface 13 and the twin wheels 11, 12 roll along a second running surface 14 parallel to the first. The running surfaces 13, 14 are in turn mounted in each case on an I-beam 15, 16, which is supported by a non-illustrated steel structure.

The twin wheels 9 to 12 are guided in a suitable manner, which may be gathered specifically from the previously mentioned DE-U-201 05 676, in such a way that they follow the course of the running surfaces 13, 14.

The two longitudinal tie-bars 7, 8 are connected to one another by a shaft 52, which extends at right angles to the feed direction and is mounted on the two longitudinal tie-bars 7, 8. On the shaft 52 two parallel swivel arms 50, 51 are provided in a rotationally locked manner and each have a link 58, 59 pivotally mounted on their end remote from the shaft 52. As driving means for swivelling the two links 58, 59 two geared motors 54 are used, which are fastened on the respective longitudinal tie-bars 7, 8 approximately in the central region thereof. The output shafts of the geared motors 54 are connected in each case by a belt drive 53 to a quill shaft, which is not visible in the drawings and extends coaxially through the shaft 52, which for this purpose is of a hollow construction. Extending from this quill shaft through the two hollow swivel arms 50, 51 are two, likewise not visible belt drives, which connect the quill shaft to the swivel bearings for the links 58, 59.

The ends of the links 58, 59 remote from the swivel arms 50, 51 are connected to one another by a transverse tie-bar 60, which extends at right angles to the direction of motion and is in turn connected rigidly to the central region of a support platform (not illustrated in the drawings) for a vehicle body. The direction of extension of the two links 58, 59 is in said case at right angles to the plane of the support platform.

The opposite end regions of the shaft 52 are connected in each case in a manner described in detail below by a linkage 40 to an air- or gas-filled bellows device 42 serving as an energy storage mechanism.

The linkages 40 are constructed as follows: they comprise in each case three elements 43, 44, 45, which are hinge-connected to one another by link pins 46, 47. All three elements 43, 44, 45 of the linkage 40 comprise in each case two parallel, planar, vertically aligned links, which are held apart from one another and at the same time connected to one another by the corresponding link pins 46, 47. The links of the first, approximately triangular element 43 are connected in the region of a corner in a rotationally locked manner to the shaft 52. The middle, arc-shaped element 44 is connected at both ends to the two link pins 46, 47. The third element 40 is constructed in the style of a double lever, which in its middle region is pivotally mounted with the aid of a further link pin 48 on an upwardly projecting region of the corresponding longitudinal tie-bar 7, 8. The ends of the links of the third element 45 remote from the middle element 44 are connected to one another by a pressure plate 49, to which the upper end face of the bellows device 42 lies adjacent and is fastened. The lower end face of the bellows device 42 is applied and fastened to a corresponding, slightly inclined surface of the longitudinal tie-bar 7.

As FIGS. 4 to 7 in particular reveal, pivotally fastened to the upwardly projecting regions of the longitudinal tie-bars 7, 8 that support the shaft 52 there is in each case a geared motor 61, by means of which a threaded spindle 61 may be set in rotation in both directions. The threaded spindle 61 penetrates a threaded coupling 63, which is fastened rotatably to a corner of the triangular element 43 of the linkage 40. When the geared motors 61, starting from the state illustrated in FIG. 5, are set in operation in one direction of rotation, the threaded couplings 63 are screwed along the threaded spindles 61 in FIG. 5 to the right, with the result that the element 43 of the linkage 40 together with the shaft 52 is moved in anticlockwise direction initially into the position illustrated in FIG. 6 and then into the position illustrated in FIG. 7. In said case, the ends of the swivel arms 50, 51, which carry the links 58, 59 and hence the vehicle body, are lowered. The torque, which is exerted on the shaft 52 by the weight of the vehicle body and of the components carrying the vehicle body, is substantially transmitted via the elements 44 and 45 of the linkage 40 to the bellows devices 42, which are elastically compressed and therefore temporarily store, in the form of elastic deformation, a large fraction of the energy that is released during lowering of the body.

If the swivel arms 50, 51 in the view of FIGS. 5 to 7 are to be swivelled back in clockwise direction, then the threaded spindles 62 are rotated in the opposite direction of rotation to before. In said case, the threaded couplings 63 are screwed along the threaded spindles 62 in the direction of the geared motors 61, resulting in a corresponding swivelling of the elements 43 and of the shaft 52. This swivelling motion is assisted by the energy of the expanding bellows devices 42, which is transmitted via the elements 44 and 45 of the linkages 40. The energy temporarily stored in the bellows devices 42 is in said case converted into lifting work.

With the aid of the described construction the energy that is needed to swivel the swivel arms 50, 51 and hence the vehicle body may be substantially reduced.

In said case, by adjusting the pressure prevailing in the bellows devices 42 the spring characteristic of these devices is adapted to the weight of the vehicle body being carried by the feed carriage 5.

The linkage 40 with its three elements 43, 44, 45 is designed in such a way that it substantially compensates two types of influence: firstly, the generally non-linear spring characteristic of the bellows devices 42 and, secondly, the dependence of the torque, which is exerted by the weight of the vehicle body and of the parts carrying the vehicle body, upon the swivelling angle, which corresponds to a sine function. Thus, the geared motors 61 that rotate the threaded spindles 62 52 need apply to the threaded spindles 61 only an extraordinarily low torque that is dependent only to a very slight extent upon the swivelling angle of the swivel arms 50, 51.

The twin wheels 9 to 12 of the feed carriage 5 are not themselves driven. Rather, forward propulsion of the feed carriage 5 is effected by means of separate press roller drives, which include the electric drive motors 32, 33 that are shown in the drawings and mounted likewise on the longitudinal tie-bars 7, 8. For details of this press roller drive, reference is made to DE-U-201 05 676.

Each feed carriage 5 comprises its own carriage controller, under the regime of which it executes both its translational movement along the running surfaces 13, 14 and the swivelling motions of the swivel arms 50, 51 and of the support platform.

The overall movement of the support platform and of the vehicle body supported thereon arises from a superposition of the linear translational movement of the feed carriage 5, a first swivelling motion that the swivel arms 50, 51 execute relative to the longitudinal tie-bars 7 and is linked to a lifting and/or lowering of the vehicle body, and a second swivelling motion that the vehicle body situated on the support platform executes relative to the swivel arms 50, 51. All of these types of movement may be carried out completely independently of one another, thereby resulting in practically any desired kinematics of the vehicle body.

The invention claimed is:

1. System for cataphoretically dip-coating vehicle bodies, comprising
   a) a plurality of treatment containers, in which the vehicle bodies are acted upon in each case by a treatment liquid;
   b) at least one feed carriage, by means of which the vehicle bodies are conveyed through the system and in the process introduced into and removed from the treatment containers and which in turn comprises:
      ba) running gear movable along the path of motion of the vehicle bodies;
      bb) at least one swivel arm coupled to the running gear;
      bc) a holding device coupled to the swivel arm for at least one vehicle body;
      bd) mutually independently actuable drives for the translational movement, the swivelling of the at least one swivel arm and of the holding device;
      be) a counterbalancing device, by means of which the energy needed to swivel the at least one swivel arm may be reduced, wherein
   c) the counterbalancing device comprises at least one energy storage mechanism comprising an elastically deformable medium which is capable of temporarily storing the energy released during lowering of the vehicle body by virtue of elastic deformation and from which the temporarily stored energy is retrievable in order to assist the upward movement of the vehicle body;
   d) the energy storage mechanism comprises at least one gas-filled bellows device;
   e) the spring characteristic of the bellows device is individually adaptable to the weight of the respective vehicle body being carried by the feed carriage by adjusting the internal pressure of the bellows device.

2. System according to claim 1, wherein a linkage comprising a plurality of hinge-connected elements lies in an energy flow between the at least one swivel arm and the energy storage mechanism.

3. System according to claim 2, wherein the linkage comprises three elements, of which the element that acts upon the energy storage mechanism is designed as a rocker-like, two-armed lever.

4. System according to claim 2, wherein the elements of the linkage comprise in each case two links, which are connected to one another by the link pins, about which the elements are pivotable.

5. System according to claim 2, wherein the drive for the at least one swivel arm comprises at least one motor, which drives a threaded spindle, which in turn interacts with a threaded coupling pivotally fastened to an element of the linkage.

6. System according to claim 1, wherein the at least one gas-filled bellows device comprises an air-filled bellows device.

* * * * *